(12) United States Patent
Dani et al.

(10) Patent No.: US 11,472,164 B2
(45) Date of Patent: Oct. 18, 2022

(54) MULTI-LAYER SUBSTRATES COMPRISING SANDWICH LAYERS AND POLYETHYLENE

(71) Applicant: The Clorox Company, Oakland, CA (US)

(72) Inventors: Nikhil P. Dani, Pleasanton, CA (US); Joerg Hendrix, Kennesaw, GA (US); Scott Wood, Pleasanton, CA (US); Hubert Chan, Pleasanton, CA (US); Daniela Fritter, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 220 days.

(21) Appl. No.: 16/710,676

(22) Filed: Dec. 11, 2019

(65) Prior Publication Data

US 2020/0198288 A1     Jun. 25, 2020

Related U.S. Application Data

(60) Provisional application No. 62/860,655, filed on Jun. 12, 2019, provisional application No. 62/828,301, (Continued)

(51) Int. Cl.
*B32B 23/02* (2006.01)
*B32B 5/02* (2006.01)
(Continued)

(52) U.S. Cl.
CPC .............. *B32B 23/02* (2013.01); *B08B 1/006* (2013.01); *B32B 5/022* (2013.01); *B32B 7/12* (2013.01);
(Continued)

(58) Field of Classification Search
CPC ..... Y10T 428/24273; Y10T 428/24298; Y10T 428/24322; Y10T 428/24331;
(Continued)

(56) References Cited

U.S. PATENT DOCUMENTS 2,684,924 A    7/1954  Leslie et al.
2,897,108 A    7/1959  Harwood
(Continued)

FOREIGN PATENT DOCUMENTS

CA    2132274        5/1995
CN    1291941 A      4/2001
(Continued)

OTHER PUBLICATIONS

International Search Report PCT/US13/48586 dated Jul. 29, 2013.
(Continued)

*Primary Examiner* — Maria V Ewald
*Assistant Examiner* — Ethan A. Utt
(74) *Attorney, Agent, or Firm* — Workman Nydegger

(57) ABSTRACT

Multi-layer substrates comprising top and bottom surface layers comprised of synthetic nonwoven fibers, and a melted thermoplastic material layer between the top and bottom layers, where the thermoplastic material comprises polyethylene or has a tan delta value of 0.2 to 0.4 within the temperature range of 100° F. to 350° F. The multi-layer substrate can include a cleaning composition loaded onto the multi-layer substrate, where a fluid pathway through the melted thermoplastic material allows the cleaning composition to travel from the top surface layer to the bottom surface layer. The multi-layer substrate may be void of chemical adhesives, where adhesion between the top surface layer and the thermoplastic layer, and between the bottom surface layer and the thermoplastic layer is instead provided by the thermoplastic material itself, which bonds to groups of fibers in the top and bottom surface layers that are in contact with the thermoplastic material as it melts.

20 Claims, 8 Drawing Sheets

Related U.S. Application Data filed on Apr. 2, 2019, provisional application No. 62/784,274, filed on Dec. 21, 2018.

(51) Int. Cl.

| | |
|---|---|
| *B32B 27/32* | (2006.01) |
| *B32B 27/12* | (2006.01) |
| *B32B 7/12* | (2006.01) |
| *B32B 27/10* | (2006.01) |
| *C11D 17/04* | (2006.01) |
| *C11D 3/30* | (2006.01) |
| *B08B 1/00* | (2006.01) |
| *B32B 29/00* | (2006.01) |
| *D21F 11/00* | (2006.01) |
| *D21F 11/14* | (2006.01) |
| *D21H 13/14* | (2006.01) |
| *D21H 27/00* | (2006.01) |
| *D21H 27/02* | (2006.01) |
| *D21H 27/36* | (2006.01) |
| *A47L 13/17* | (2006.01) |

(52) U.S. Cl.
CPC .............. *B32B 27/10* (2013.01); *B32B 27/12* (2013.01); *B32B 27/32* (2013.01); *B32B 29/002* (2013.01); *C11D 3/30* (2013.01); *C11D 17/041* (2013.01); *D21F 11/006* (2013.01); *D21F 11/14* (2013.01); *D21H 13/14* (2013.01); *D21H 27/002* (2013.01); *D21H 27/02* (2013.01); *D21H 27/36* (2013.01); *A47L 13/17* (2013.01); *B32B 2250/03* (2013.01); *B32B 2250/40* (2013.01); *B32B 2260/04* (2013.01); *B32B 2262/062* (2013.01); *B32B 2274/00* (2013.01); *B32B 2307/724* (2013.01); *B32B 2307/728* (2013.01); *B32B 2367/00* (2013.01); *B32B 2432/00* (2013.01); *Y10T 428/3188* (2015.04); *Y10T 428/31855* (2015.04)

(58) Field of Classification Search
CPC ..... Y10T 428/24479; Y10T 428/24562; Y10T 428/24612; Y10T 428/24802; Y10T 428/2481; Y10T 428/24843; Y10T 428/24851; Y10T 428/31855; Y10T 428/31909; Y10T 428/31913; Y10T 428/3192; Y10T 428/31928; Y10T 428/31935; Y10T 428/31938; Y10T 428/31786; Y10T 428/31797; Y10T 428/31725; Y10T 428/31728; Y10T 428/3175; Y10T 428/31757; Y10T 442/50; Y10T 442/56; Y10T 442/59; Y10T 442/60; Y10T 442/659; Y10T 442/666; Y10T 442/667; Y10T 442/668; Y10T 442/669; Y10T 442/671; Y10T 442/674; Y10T 442/678; Y10T 442/68; Y10T 442/681; Y10T 442/682; Y10T 442/684; Y10T 442/688; Y10T 442/689; Y10T 442/69; Y10T 442/692; B32B 3/00; B32B 3/24; B32B 3/26; B32B 3/266; B32B 3/28; B32B 3/30; B32B 5/00; B32B 5/02; B32B 5/022; B32B 5/06; B32B 5/067; B32B 5/08; B32B 5/22; B32B 5/24; B32B 5/26; B32B 5/265; B32B 5/266; B32B 5/267; B32B 5/268; B32B 5/269; B32B 5/271; B32B 5/28; B32B 7/00; B32B 7/04; B32B 7/05; B32B 7/12; B32B 7/14; B32B 27/00; B32B 27/02; B32B 27/04; B32B 27/06; B32B 27/08; B32B 27/12; B32B 27/30; B32B 27/302; B32B 27/304; B32B 27/306; B32B 27/308; B32B 27/32; B32B 27/322; B32B 27/34; B32B 27/36; B32B 2432/00; D04H 1/00; D04H 3/00; D04H 3/005; D04H 3/007; D04H 3/08; D04H 3/10; D04H 3/102; D04H 3/105; D04H 3/11; D04H 3/12; D04H 5/00; D04H 5/02; D04H 5/03; D04H 5/04; D04H 5/06; D04H 5/08; A47L 13/00; A47L 13/10; A47L 13/16; A47L 13/17; A47L 13/26; A47L 13/42
USPC ....... 428/131, 134, 137, 138, 156, 166, 172, 428/195.1, 196, 200, 201, 500, 515, 516, 428/518, 520, 522, 523, 480, 483, 474.4, 428/474.7, 476.3, 476.9; 442/320, 324, 442/326, 327, 381, 387, 388–390, 392, 442/394, 398, 400–403, 407–409, 411, 442/415; 15/208, 209.1, 226, 229.11, 15/229.12
See application file for complete search history.

(56) References Cited

U.S. PATENT DOCUMENTS

| | | | |
|---|---|---|---|
| 2,990,425 A | 6/1961 | Norman | |
| 3,240,326 A | 3/1966 | Miller | |
| 3,468,898 A | 9/1969 | Cutler et al. | |
| 3,849,241 A | 11/1974 | Butin et al. | |
| 3,929,135 A * | 12/1975 | Thompson | B32B 3/28 604/385.08 |
| 3,929,678 A | 12/1975 | LAughlin et al. | |
| 4,022,834 A | 5/1977 | Gundersen | |
| 4,053,636 A | 10/1977 | Eustis et al. | |
| 4,171,047 A | 10/1979 | Doyle | |
| 4,198,392 A | 4/1980 | Juneja | |
| 4,259,217 A | 3/1981 | Murphy | |
| 4,353,480 A | 10/1982 | McFadyen | |
| 4,463,045 A | 7/1984 | Ahr et al. | |
| 4,540,505 A | 9/1985 | Frazier | |
| 4,564,647 A | 1/1986 | Hayashi et al. | |
| 4,574,021 A | 3/1986 | Endres | |
| 4,741,944 A | 5/1988 | Jackson | |
| 4,778,048 A | 10/1988 | Kaspar et al. | |
| 4,885,202 A | 12/1989 | Lloyd | |
| 5,145,604 A | 9/1992 | Neumiller | |
| 5,238,534 A | 8/1993 | Manning et al. | |
| 5,246,772 A | 9/1993 | Manning | |
| 5,292,581 A | 3/1994 | Viazmensky et al. | |
| 5,342,534 A | 8/1994 | Skrobala et al. | |
| 5,444,094 A | 8/1995 | Malik et al. | |
| 5,454,984 A | 10/1995 | Graubart et al. | |
| 5,459,912 A | 10/1995 | Oathout | |
| 5,460,833 A | 10/1995 | Andrews et al. | |
| 5,522,942 A | 6/1996 | Graubart et al. | |
| 5,595,786 A | 1/1997 | McBride et al. | |
| 5,686,015 A | 11/1997 | Willey et al. | |
| 5,776,872 A | 7/1998 | Giret et al. | |
| 5,798,329 A | 8/1998 | Taylor et al. | |
| 5,814,591 A | 9/1998 | Mills et al. | |
| 5,883,059 A | 3/1999 | Furman et al. | |
| 5,883,062 A | 3/1999 | Addison et al. | |
| 5,906,973 A | 5/1999 | Ouzounis et al. | |
| 5,908,854 A | 6/1999 | McCue et al. | |
| 5,922,665 A | 7/1999 | Liu | |
| 5,948,743 A | 9/1999 | Fonsny et al. | |
| 6,017,869 A | 1/2000 | Lu et al. | |
| 6,080,706 A | 6/2000 | Blanvalet et al. | |
| 6,090,768 A | 7/2000 | Delaney et al. | |
| 6,110,295 A | 8/2000 | Lu et al. | |
| 6,121,224 A | 9/2000 | Fonsny et al. | |
| 6,130,197 A | 10/2000 | Bedrod et al. | |
| 6,143,244 A | 11/2000 | Xia et al. | |

(56) References Cited

U.S. PATENT DOCUMENTS

| | | | |
|---|---|---|---|
| 6,143,281 A | 11/2000 | Alexander et al. | |
| 6,153,568 A | 11/2000 | McCanna et al. | |
| 6,187,737 B1 | 2/2001 | Geke et al. | |
| 6,221,823 B1 | 4/2001 | Crisanti et al. | |
| 6,270,875 B1 * | 8/2001 | Nissing | B32B 7/02 428/138 |
| 6,277,805 B1 | 8/2001 | Kupneski | |
| 6,323,171 B1 | 11/2001 | Fonsny et al. | |
| 6,339,057 B1 | 1/2002 | Knox et al. | |
| 6,342,474 B1 | 1/2002 | Kerobo et al. | |
| 6,346,279 B1 | 2/2002 | Rochon | |
| 6,358,900 B1 | 3/2002 | Wigley et al. | |
| 6,368,609 B1 | 4/2002 | Fontenot et al. | |
| 6,376,455 B1 | 4/2002 | Friedli et al. | |
| 6,380,151 B1 | 4/2002 | Masters et al. | |
| 6,387,855 B1 | 5/2002 | de la Mettrie | |
| 6,387,866 B1 | 5/2002 | Mondin et al. | |
| 6,387,871 B2 | 5/2002 | Faber | |
| 6,429,183 B1 | 8/2002 | Leonard et al. | |
| 6,462,014 B1 | 10/2002 | Johnson et al. | |
| 6,551,980 B1 | 4/2003 | Wisniewski et al. | |
| 6,583,104 B1 | 6/2003 | Christensen et al. | |
| 6,589,892 B1 | 7/2003 | Smith et al. | |
| 6,596,681 B1 | 7/2003 | Mahieu et al. | |
| 6,680,264 B2 | 1/2004 | Julemont | |
| 6,693,070 B1 | 2/2004 | Cheung et al. | |
| 6,699,825 B2 | 3/2004 | Rees et al. | |
| 6,737,068 B2 | 5/2004 | Durden | |
| 6,803,057 B2 | 10/2004 | Ramirez et al. | |
| 6,812,196 B2 | 11/2004 | Rees et al. | |
| 6,814,088 B2 | 11/2004 | Barnabas et al. | |
| 6,825,158 B2 | 11/2004 | Mitra et al. | |
| 6,831,050 B2 | 12/2004 | Murch et al. | |
| 6,844,308 B1 | 1/2005 | Dastbaz et al. | |
| 6,849,589 B2 | 2/2005 | Liu | |
| 6,936,580 B2 | 8/2005 | Sherry et al. | |
| 6,936,597 B2 | 8/2005 | Greenwald et al. | |
| 7,008,600 B2 | 3/2006 | Katsigras et al. | |
| 7,070,737 B2 | 7/2006 | Bains et al. | |
| 7,071,155 B2 | 7/2006 | Griese et al. | |
| 7,214,651 B2 | 5/2007 | Mohr et al. | |
| 7,348,303 B2 | 3/2008 | Gallotti et al. | |
| 7,354,604 B2 | 4/2008 | Ramirez et al. | |
| 7,396,808 B1 | 7/2008 | Hood et al. | |
| 7,414,017 B2 | 8/2008 | Kong et al. | |
| 7,465,684 B2 | 12/2008 | Hurley et al. | |
| 7,511,006 B2 | 3/2009 | Shimmin et al. | |
| 7,530,361 B2 | 5/2009 | Killeen et al. | |
| 7,550,416 B2 | 6/2009 | Woo et al. | |
| 7,696,109 B2 | 4/2010 | Ouellette et al. | |
| 7,696,143 B2 | 4/2010 | McCue et al. | |
| 7,732,357 B2 | 6/2010 | Annis et al. | |
| 7,915,207 B2 | 3/2011 | Herdt et al. | |
| 8,118,177 B2 | 2/2012 | Drapela et al. | |
| 8,173,146 B2 | 5/2012 | Leroy | |
| 8,252,819 B2 | 8/2012 | Felder et al. | |
| 8,278,260 B2 | 10/2012 | Victor | |
| 8,283,304 B2 | 10/2012 | Victor | |
| 8,569,220 B2 | 10/2013 | Gaudreault | |
| 8,575,084 B2 | 11/2013 | Gaudreault | |
| 8,603,622 B2 | 12/2013 | Roettger et al. | |
| 8,648,027 B2 | 2/2014 | Mitchell et al. | |
| 9,005,738 B2 | 4/2015 | Baker et al. | |
| 9,006,165 B2 | 4/2015 | Mitchell et al. | |
| 9,138,943 B2 | 9/2015 | Weinberg et al. | |
| 9,234,165 B2 | 1/2016 | Hope et al. | |
| 9,826,736 B2 | 11/2017 | Napolitano et al. | |
| 9,988,594 B2 | 6/2018 | Hope et al. | |
| 10,064,409 B2 | 9/2018 | Hazenkamp et al. | |
| 10,982,177 B2 | 4/2021 | Dani | |
| 2002/0148547 A1 | 10/2002 | Abed et al. | |
| 2003/0036741 A1 | 2/2003 | Abba et al. | |
| 2003/0041953 A1 | 3/2003 | Farell et al. | |
| 2003/0073600 A1 | 4/2003 | Avery et al. | |
| 2003/0118825 A1 | 6/2003 | Melius et al. | |
| 2003/0220048 A1 | 11/2003 | Toro | |
| 2003/0228991 A1 | 12/2003 | Johnson et al. | |
| 2004/0209792 A1 | 10/2004 | Mitra et al. | |
| 2004/0224867 A1 | 11/2004 | Colurciello et al. | |
| 2005/0026802 A1 | 2/2005 | Kilkenny et al. | |
| 2005/0136238 A1 | 6/2005 | Lindsay et al. | |
| 2005/0148655 A1 | 7/2005 | Manzer | |
| 2005/0159063 A1 | 7/2005 | Hill | |
| 2005/0215458 A1 | 9/2005 | Lalum et al. | |
| 2005/0227898 A1 | 10/2005 | Leskowicz et al. | |
| 2006/0016785 A1 | 1/2006 | Egbe et al. | |
| 2006/0052264 A1 | 3/2006 | Lu | |
| 2006/0172912 A1 | 8/2006 | Burt et al. | |
| 2006/0234899 A1 | 10/2006 | Nekmard et al. | |
| 2007/0037721 A1 | 2/2007 | Michels | |
| 2007/0185004 A1 | 8/2007 | Kilkenny et al. | |
| 2007/0190172 A1 | 8/2007 | Bobbert | |
| 2008/0003906 A1 | 1/2008 | Hill et al. | |
| 2008/0261856 A1 | 10/2008 | Nakagawa et al. | |
| 2008/0287331 A1 | 11/2008 | Lin et al. | |
| 2010/0101605 A1 | 4/2010 | Victor | |
| 2010/0160205 A1 | 6/2010 | Ouellette et al. | |
| 2010/0249245 A1 | 9/2010 | Whiteley et al. | |
| 2010/0323895 A1 | 12/2010 | Garner | |
| 2011/0098206 A1 | 4/2011 | Lynch et al. | |
| 2011/0211600 A1 | 9/2011 | Dantus et al. | |
| 2011/0219312 A1 | 9/2011 | Kim et al. | |
| 2011/0311600 A1 | 12/2011 | Polzin et al. | |
| 2012/0034287 A1 | 2/2012 | Napolitano et al. | |
| 2012/0156461 A1 | 6/2012 | Krishnamurthy | |
| 2012/0227203 A1 | 9/2012 | Ouellette et al. | |
| 2013/0028990 A1 | 1/2013 | Smith et al. | |
| 2014/0093698 A1 | 4/2014 | Perry et al. | |
| 2014/0109333 A1 * | 4/2014 | Gummow | A47L 13/17 15/104.93 |
| 2018/0001591 A1 | 1/2018 | Dutkiewicz | |
| 2018/0030391 A1 | 2/2018 | Lin et al. | |
| 2018/0216044 A1 | 8/2018 | Ojha et al. | |
| 2019/0082926 A1 | 3/2019 | Dani | |
| 2019/0082927 A1 | 3/2019 | Dani | |
| 2019/0085274 A1 | 3/2019 | Dani | |
| 2019/0085275 A1 | 3/2019 | Dani | |
| 2019/0105869 A1 | 4/2019 | Dani | |
| 2019/0106820 A1 | 4/2019 | Dani | |
| 2020/0040496 A1 | 2/2020 | Dani | |
| 2020/0080031 A1 | 3/2020 | Dani et al. | |
| 2020/0198303 A1 | 6/2020 | Dani et al. | |
| 2020/0199824 A1 | 6/2020 | Dani et al. | |
| 2021/0207068 A1 | 7/2021 | Dani | |

FOREIGN PATENT DOCUMENTS

| | | |
|---|---|---|
| CN | 1533255 A | 9/2004 |
| CN | 1678785 A | 10/2005 |
| CN | 103814163 A | 5/2014 |
| CN | 105208989 A | 12/2015 |
| DE | 1964106 U | 7/1967 |
| DE | 1964190 A1 | 7/1970 |
| DE | 2027540 A1 | 12/1971 |
| DE | 2212259 | 10/1972 |
| DE | 2627548 | 1/1977 |
| DE | 1964196 B2 | 2/1977 |
| EP | 0024031 A1 | 2/1981 |
| EP | 2843034 A1 | 3/2015 |
| EP | 3024031 A1 | 5/2016 |
| GB | 1267848 A | 3/1972 |
| GB | 1526778 | 9/1978 |
| WO | 9845519 | 10/1998 |
| WO | 98/55295 A1 | 12/1998 |
| WO | 99/18180 A1 | 4/1999 |
| WO | 99/53006 A1 | 10/1999 |
| WO | 200034567 | 6/2000 |
| WO | 200059439 | 10/2000 |
| WO | 200129301 | 4/2001 |
| WO | 02057528 | 7/2002 |
| WO | 2004/067194 A2 | 8/2004 |
| WO | 2004/104147 A1 | 12/2004 |
| WO | 2007/073877 | 7/2007 |
| WO | 2008/008663 A1 | 1/2008 |

(56) References Cited

FOREIGN PATENT DOCUMENTS

| | | |
|---|---|---|
| WO | 2010/028238 A1 | 3/2010 |
| WO | 2010/101864 | 9/2010 |
| WO | 2011/064554 | 6/2011 |
| WO | 2017123740 | 7/2017 |
| WO | 2017/174959 A1 | 10/2017 |
| WO | 2018197937 | 11/2018 |

OTHER PUBLICATIONS

Notice of Allowance received for U.S. Appl. No. 16/710,857, dated Dec. 2, 2021, 7 pages.
Notice of Allowance received for U.S. Appl. No. 16/710,857, dated Dec. 9, 2021, 4 pages.
Notice of Allowance received for U.S. Appl. No. 16/710,774, dated Mar. 3, 2022, 2 pages.
U.S. Appl. No. 16/042,690, filed Jul. 23, 2018.

\* cited by examiner

MULTI-LAYER SUBSTRATES COMPRISING SANDWICH LAYERS AND POLYETHYLENE

CROSS-REFERENCE TO RELATED APPLICATIONS

The present application claims the benefit of U.S. Provisional Patent Application No. 62/860,655 filed on Jun. 12, 2019, U.S. Provisional Patent Application No. 62/828,301 filed on Apr. 2, 2019 and U.S. Provisional Patent Application No. 62/784,274 filed on Dec. 21, 2018. The disclosure of each of the foregoing is herein incorporated by reference in its entirety.

BACKGROUND OF THE INVENTION

1. The Field of the Invention

The present invention relates to cleaning wipes, more particularly to pre-moistened cleaning wipes that are formed from multi-layer substrates.

2. Description of Related Art

Numerous cleaning wipes are available, e.g., such as CLOROX DISINFECTING WIPES. While such wipes provide good overall cleaning and disinfection characteristics, versatility, and convenience, there is a continuing need for improved cleaning wipes, as well as methods for their manufacture.

BRIEF SUMMARY

The present invention relates to wipes that may typically be pre-moistened during manufacture, where the wipe includes a multi-layer substrate comprising top and bottom surface layers which comprise a synthetic nonwoven material, with a melted thermoplastic material that comprises polyethylene or another material having a tan delta value of from 0.2 to 0.4 within the temperature range of 100° F. to 350° F. The synthetic nonwoven material is a fibrous nonwoven, e.g., such as a meltblown, spunbond, spunlaid, SMS (spunbond-meltblown-spunbond), coform, airlaid, wetlaid, carded web, thermal bonded, through-air bonded, thermoformed, spunlace, hydroentangled, needled, chemically bonded, or combinations thereof. The synthetic nonwoven material forming the top and bottom surface layers may consist of, or consist essentially of such synthetic materials (e.g., substantially all fibers may be synthetic). In another embodiment, a blend of synthetic and pulp fibers could be used. The top and bottom surface layers may be identical to one another. In addition to these 3 layers, a cleaning composition is provided, loaded onto the multi-layer substrate. Because the thermoplastic film layer at the interior of the "sandwich" structure has been melted, it is porous, and there is a fluid pathway provided through the melted thermoplastic material layer, which allows the cleaning composition to travel from the top surface layer to the bottom surface layer, through the fluid pathway of the porous melted thermoplastic material layer. The multi-layer substrate may be void of any chemical adhesives for holding the plurality of layers together, or even for holding fibers of a given layer together. In some embodiments, agents also used as binders may technically be present in a given layer (e.g., in relatively small amounts) as a processing aid, although the purpose of such included agents, like kymene, may be to impart strength to given fibers, rather than for any purpose of actually adhering either surface layer to the thermoplastic material layer. Instead, the melted thermoplastic material bonds to groups of fibers (e.g., in the top and bottom layers that were in contact with the thermoplastic material as it melted, holding the overall structure together.

Another embodiment is directed to a multi-layer substrate comprising top and bottom surface layers consisting essentially of synthetic fibers, and a porous melted thermoplastic film layer between the top and bottom synthetic layers, where the thermoplastic film layer has a tan delta value of 0.2 to 0.4 within the temperature range of 100° F. to 350° F. The thermoplastic film layer is very thin, e.g., with a thickness of less than 0.05 mm. The multi-layer substrate can also include a cleaning composition loaded onto the multi-layer substrate, where a fluid pathway through the porous melted thermoplastic film layer allows the cleaning composition to travel from the top surface layer to the bottom surface layer. The multi-layer substrate may be void of chemical adhesives, where adhesion between the top surface layer and the thermoplastic layer, and between the bottom surface layer and the thermoplastic layer is instead provided by the thermoplastic film layer itself, which bonds to groups of fibers in the top and bottom surface layers that are in contact with the thermoplastic film layer as it melts.

The referenced tan delta value is defined as the ratio of viscous modulus divided by elastic modulus. It therefore provides information relative to the ratio of a material's viscous liquid phase stiffness or flow characteristics relative to the material's solid phase stiffness characteristics. Different polymeric materials exhibit different tan delta characteristics, and this ratio also varies for a given material with temperature. Polyethylene is an exemplary material that exhibits a tan delta value in a range of 0.2 to 0.4 within the temperature range of 100° F. to 350° F. Other polymeric materials (e.g., polypropylene) do not necessarily exhibit such characteristics. Applicant has found that tan delta is a good indicator of whether a given polymeric material will result in a melted thermoplastic "sandwich" layer that effectively bonds to the nonwoven layers both above and below the thermoplastic inner "sandwich" layer, while at the same time opening up fluid pathways through the thermoplastic layer, allowing liquids (e.g., a cleaning composition) to flow between the top and bottom layers, through the thermoplastic layer.

Another embodiment relates to a method of manufacturing a multi-layer substrate, including providing both top and bottom surface layers, e.g., each comprising or consisting essentially of any of various suitable synthetic nonwovens, providing a thermoplastic film material layer (e.g., initially impervious to liquid) that comprises polyethylene and/or has a tan delta value of 0.2 to 0.4 within the temperature range of 100° F. to 350° F., and heating the film material layer to a temperature at which the thermoplastic film material softens, opening pores through the film or breaks in the film, so as to provide a fluid pathway through the thermoplastic film layer so that any liquid loaded onto the top surface layer is able to pass through the fluid pathway, to the bottom surface layer. Once so formed, the multi-layer substrate can be loaded with a cleaning composition, e.g., by applying the cleaning composition to the top and/or bottom surface layer(s). Because of the fluid pathway, fluid communication is possible from one surface layer to the other, through the fluid pathway in the thermoplastic film layer.

During such manufacturing, pressure can be applied with the application of heat during formation of the fluid pathway through the thermoplastic material. The application of heat, and optional application of pressure at the same time, may serve to bond the thermoplastic material to groups of fibers in the top and bottom layers that are in contact with the thermoplastic material as it softens, such that no chemical adhesives are used to adhere the top and bottom layers to the thermoplastic material. Where a thermoplastic material not having the described tan delta characteristics is used under similar conditions, even when applying heat and pressure, the bonding and/or flow path opening may not result.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

FIG. 2 is an SEM image of the top surface of an exemplary multi-layer substrate, showing two adjacent unbonded raised regions, with the bonded region extending there-between.

DETAILED DESCRIPTION OF THE PREFERRED EMBODIMENTS

Definitions

Figure 1A:
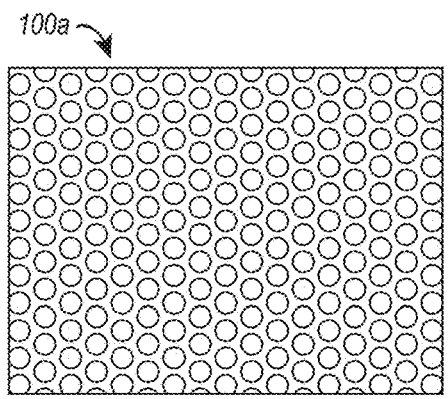
FIGS. 1A-1D show schematic views of exemplary multi-layer substrate textures with various dot patterns.
Figure 1B:
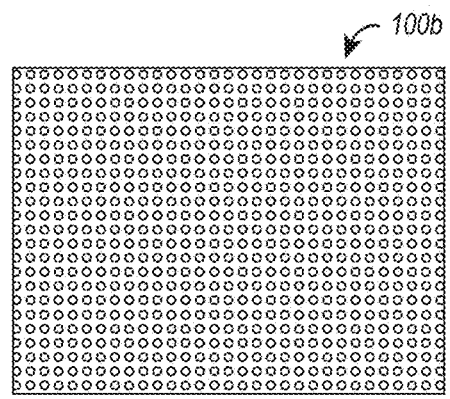
Figure 1C:
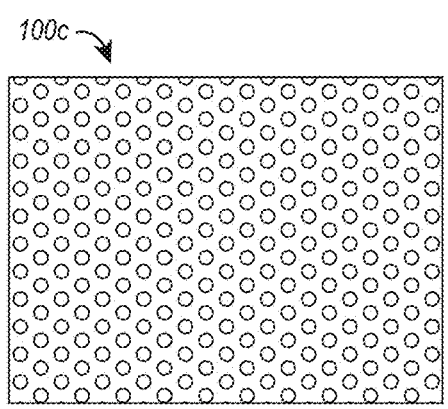
Figure 1D:
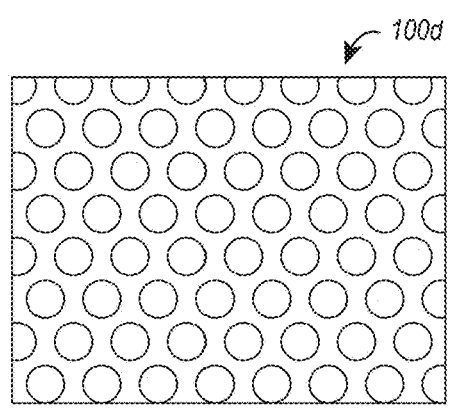

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase "substantially free of" or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005°/), less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications. Such substrates may typically be in the form of a wipe.

Such substrates may be formed of a structure of individual fibers which are interlaid, typically in a manner that is not identifiable, similar to a nonwoven. The top and bottom surface layers or pulp layers included in the present substrates may be formed by any suitable process. For example, they may be meltblown, spunbond, spunlaid, SMS (spunbond-meltblown-spunbond), coformed, carded webs, thermal bonded, thermoformed, spunlace, hydroentangled, needled, or chemically bonded. Various processes for forming such nonwovens will be apparent to those of skill in the art, many of which are described in U.S. Pat. No. 7,696,109, incorporated herein by reference in its entirety. Synthetic fibers may generally be circular in cross-section. Any of various polymers, or combinations of various polymers, may be used in forming the synthetic nonwoven external layers. Examples of suitable materials may include polyethylene, polypropylene, PET, PVC, polyacrylics, polyvinyl acetates, polyvinyl alcohols, polyamides, polystyrenes, or the like. In an embodiment, the external layers may comprise a material other than polyethylene, e.g., as the sandwich layer may be polyethylene. The thermoplastic sandwich layer may also be provided as a synthetic nonwoven, formed according to any desired process. The thermoplastic layer may also be a "cast" film, e.g., rather than being comprised of fibers. The basis weight of any of the multiple layers of the substrate may be expressed in grams per square meter (gsm). Basis weight of such substrates may sometimes also be expressed in "pounds" (e.g., referring to lbs/3000 ft$^2$ of the sheet material).

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization, other cleaning, or other treatment. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 10 minutes, within 5 minutes, within 4 minutes, within 3 minutes, within 2 minutes, or within 1 minute), when sanitizing or disinfecting.

As used herein, the term "disinfect" shall mean the elimination of many or all "target" pathogenic microorganisms on surfaces with the exception of bacterial endospores.

As used herein, the term "sterilize" shall mean the complete elimination or destruction of all forms of "target" microbial life and which is authorized under the applicable regulatory laws to make legal claims as a "sterilant" or to have sterilizing properties or qualities. Some embodiments may provide for at least a 2 or more log reduction (e.g., 3-log reduction, or 6-log reduction) in a bacterial population within a designated time period (e.g., 10 minutes, 5 minutes, 4 minutes, 3 minutes, 1 minute, 30 seconds, 10 seconds or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that microefficacy can also be achieved against other target microbes, numerous examples of which will be apparent to those of skill in the art. It will also be appreciated that the present cleaning compositions need not include an antimicrobial agent, where sanitization or disinfection is not necessarily desired.

The term "texture" as used herein refers to the character or appearance of a substrate as determined by the arrangement and thickness of its constituent fibers. In at least some instances, texture can be quantified using imaging techniques and/or caliper measurements at the local and macro scales, as described in Applicant's application Ser. No. 16/042,690, filed Jul. 23, 2018, herein incorporated by reference in its entirety. By way of explanation, "patterns" are typically visual, with areas of discernable contrast. "Texture" is typically tactile, and relates to variations relative to the normal plane of the substrate (i.e., 3-dimensional texture in the substrate). Visual pattern and tactile texture interact in a complex manner with a user's visual/tactile sense of sight and touch to produce a given aesthetic perception for a given substrate, in addition to other quantifiable technical characteristics associated with such.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to multilayer substrates including at least 3 layers, in which the exterior faces of the wipe are provided by synthetic fibers, such as meltblown, spunbond, spunlaid, SMS (spunbond-meltblown-spunbond), coform, carded webs, thermal bonded, thermoformed, spunlace, hydroentangled, needled, or chemically bonded, fibers. In some embodiments, the exterior surface layers could be formed as a blend from such fibers in combination with pulp (e.g., plant-based, structured) fibers. An interior "sandwich" layer comprising a thermoplastic material (e.g., different from the exterior layers) is provided, between the top and bottom exterior layers, which adheres the entire multi-layer substrate together in a single mass, with low risk of delamination, while providing desired characteristics relative to hand-feel, stiffness, and absorbency (ability to load the substrate to a desired loading ratio with a cleaning composition), while also providing a fluid pathway through the thermoplastic layer through which the cleaning composition can migrate from the top surface layer, to the bottom surface layer, or vice versa. Because the thermoplastic layer melts in contact with fibers of the adjacent exterior surface layers, and particularly given the tan delta characteristics of the thermoplastic material, the melt softened thermoplastic material encapsulates, envelops, wraps, or otherwise coats individual adjacent fibers of the tissue layer, providing a strong bond between the two adjacent layers, such that delamination does not readily occur. The fibers of the exterior surface layers may provide differing characteristics, such that they do not melt soften in the same way the interior sandwich layer does, at the given processing conditions. In addition, the thermoplastic sandwich "cheese" layer typically does not penetrate through the exterior "bread" surface layers, so that none of the melt softened thermoplastic material with specific tan delta characteristics is on the exposed exterior faces of the wipe. This results in the advantage that relatively softer fibers can be used for wiping and cleaning versus contact with harder more abrasive melt softened fibers. For example, even very soft pulp fibers can be incorporated into the exterior surface layers. The wipe may thus be less harsh on the surfaces being treated so as to reduce risk of undesirable mechanical scratching, abrasion, or erosion.

Such multi-layer substrates may be formed through a thermal and pressure calendaring process in which the top and bottom synethetic layers are provided (e.g., these nonwoven layers are provided preformed), and a thermoplastic film layer comprising polyethylene or another polymer having suitable tan delta values is also provided. Many commercially available multi-layer hard surface cleaning substrates have external layers made of synthetic thermoplastic materials with a layer of pulp fibers positioned in the middle of the synthetic material layers to ensure that the pulp fibers are not lost through abrasion during the cleaning process. In contrast, an embodiment of the present invention minimizes risk of any pulp fibers "escaping" by ensuring that the sandwich "cheese" layer has the desired tan delta characteristics, so that it melts during heating in the manufacturing press, and forms a strong bond to fibers of the adjacent exterior surface layer. Even where the exterior surface layer includes some loading of pulp fibers (e.g., as a blend of synthetic and pulp fibers), the fibers of the exterior surface layers are advantageously strongly held to the interior melt-softened thermoplastic "cheese" layer at the center of the substrate structure, rather than easily abrading away. No matter the composition of the exterior surface layers, this configuration allows bonding of the 3 layers into an integral, single substrate structure, without the need for any chemical adhesives.

The layers may be assembled (e.g., with the synthetic top and bottom layers as "bread" sandwiching the thermoplastic film layer (as "cheese") therebetween), followed by subjecting the assembly to heat (and typically pressure) at a temperature that melt softens the thermoplastic material. Advantageously, these conditions may not melt soften the top and bottom layers, which may complicate manufacturing. That said, embodiments may be possible where such melt-softening of more than the "cheese" layer occurs. Heating of the thermoplastic layer positioned between the synthetic external layers opens pores through the thermoplastic film layer, e.g., even if the film was initially impervious to liquid, while also softening the thermoplastic material so that it wraps around or otherwise coats the adjacent fibers of the top and bottom surface layers, effectively tying the adjacent layers to one another, without any chemical adhesive to prevent the layers from delaminating or pulling apart from one another. At the same time that this layer bonding occurs, any impervious film characteristics that previously existed with respect to the interior thermoplastic layer are broken, so that a fluid pathway is created through the thermoplastic layer, through which a cleaning composition or other liquids applied to either the top or bottom layer can penetrate from one surface layer to the other surface layer, through the thermoplastic film layer.

Once the dry substrate has been formed, a desired cleaning composition may be loaded onto the multi-layer substrate. Because of the presence of the fluid pathway, even if the cleaning composition is loaded as a liquid only one of the top or bottom layers, it will flow through the substrate to the other exterior layer through the broken thermoplastic film layer.

III. Exemplary Multi-Layer Substrates

Figure 1E:
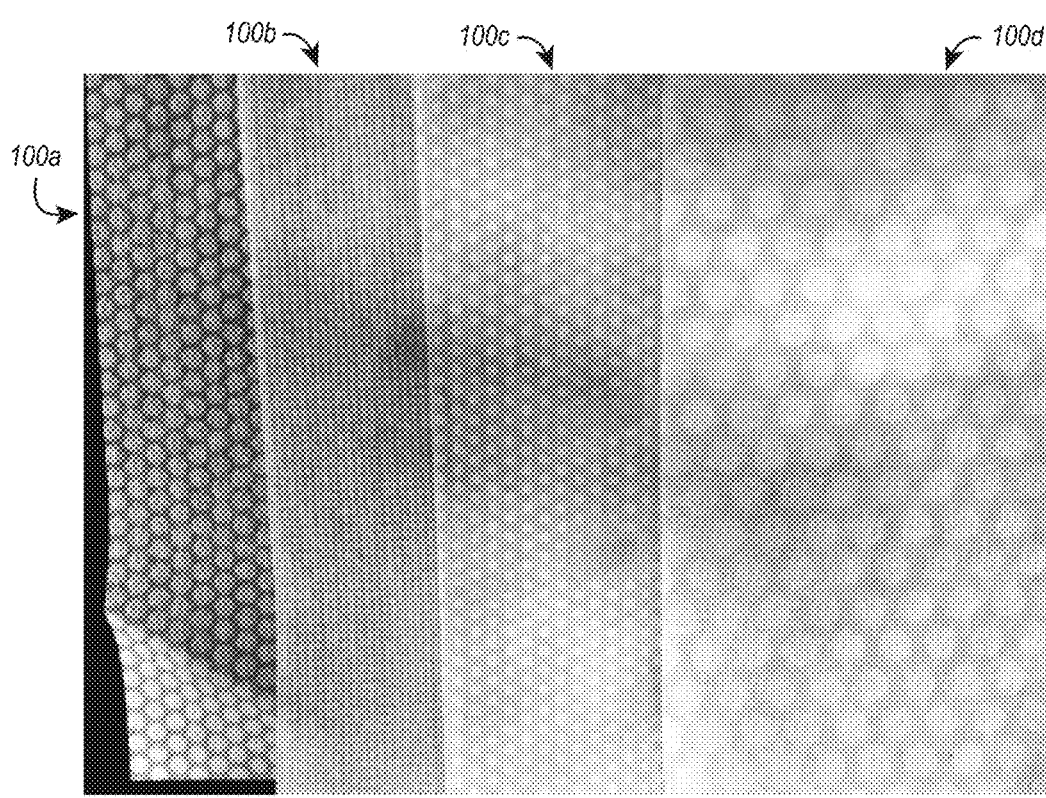
FIG. 1E is a photograph showing 4 different exemplary multi-layer substrate textures that can be formed, each with differently sized unbonded raised texture features (i.e., raised dots).

FIGS. 1A-1D illustrate exemplary wipes 100a-100d, each with a different applied surface texture and bonding pattern, but where each is configured as a multi-layer substrate including a melted thermoplastic film layer sandwiched between top and bottom synthetic layers. While shown with various textures, it will be appreciated that numerous other textures could be provided, or perhaps no texture at all. Additional exemplary textures are shown in FIGS. 7A-7F. FIG. 1E shows photographs of 4 exemplary multi-layer wipes 100a-100d, showing similar textures as in FIGS. 1A-1D.

Figure 2:
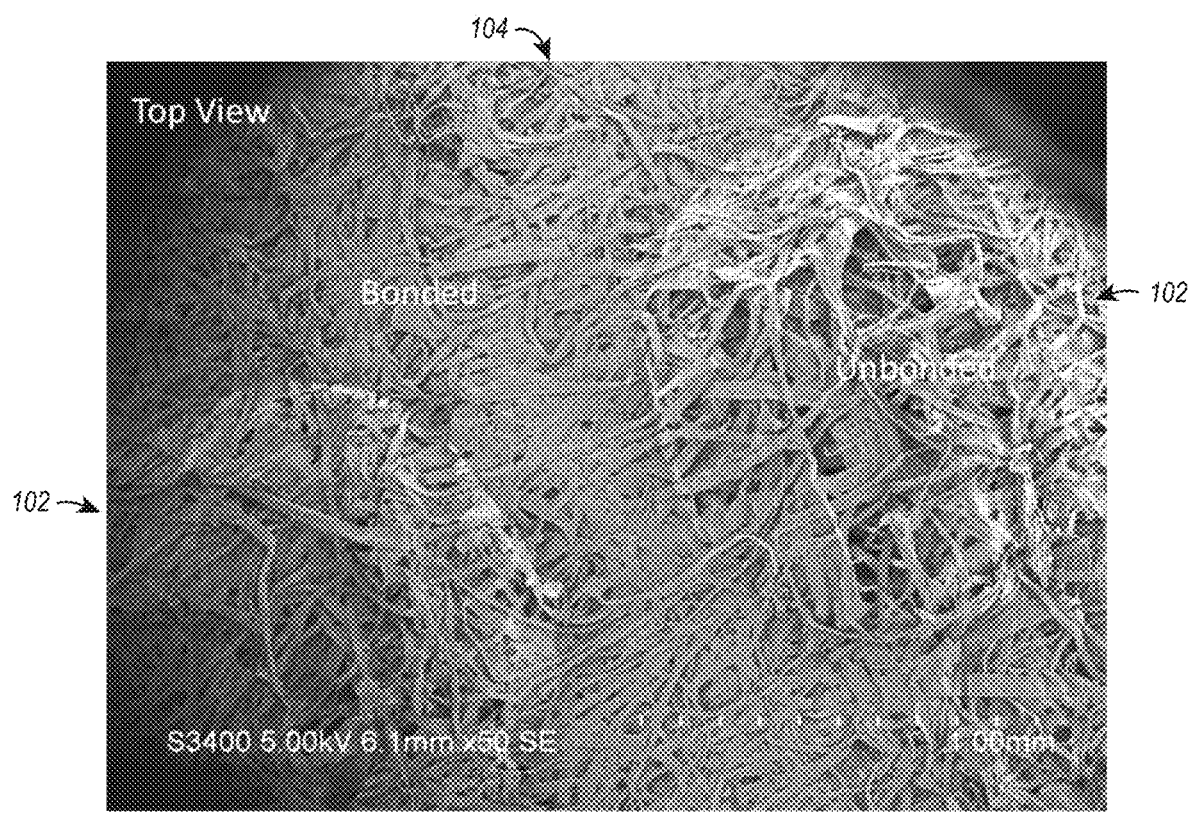

FIG. 2 shows a close up of one of the raised ridges 102 of an exemplary wipe, showing how the raised circular ridge 102 (a "dot") is unbonded to the thermoplastic film layer disposed therebelow, such that there is actually a gap therebetween, at the ridge 102. The region 104 surrounding the raised ridge 102 is bonded (and is so labeled) to the underlying thermoplastic film layer disposed therebelow. Depending on the particular applied textured pattern, the bonded region 104 may be contiguous, as shown (i.e., there is a single contiguous bonded region, rather than multiple bonded regions that are fully separated from one another). In other words, by "contiguous", one can reach any particular location in the bonded region from any other particular location in the bonded region, by traversing only other bonded regions, without any need to traverse an unbonded region. The bonded region 104 may thus be contiguous, even though it does not cover the entire top exterior face (or bottom exterior face) of the wipe, because there are spaced apart unbonded regions 102. Stated another way, by analogy, the unbonded regions may be configured as "islands" in a "sea" of the bonded region. It will be appreciated that other configurations are of course possible.

The texture may be an embossed texture that is applied during a thermal calendaring or other manufacturing operation that laminates the 3 layers of the "sandwich" structure together. Alternatively, the texture could have been introduced into the substrate structure during manufacture of the synthetic top and bottom surface layer(s). A texture may be present in the top layer, the bottom layer, or both.

Figure 3:
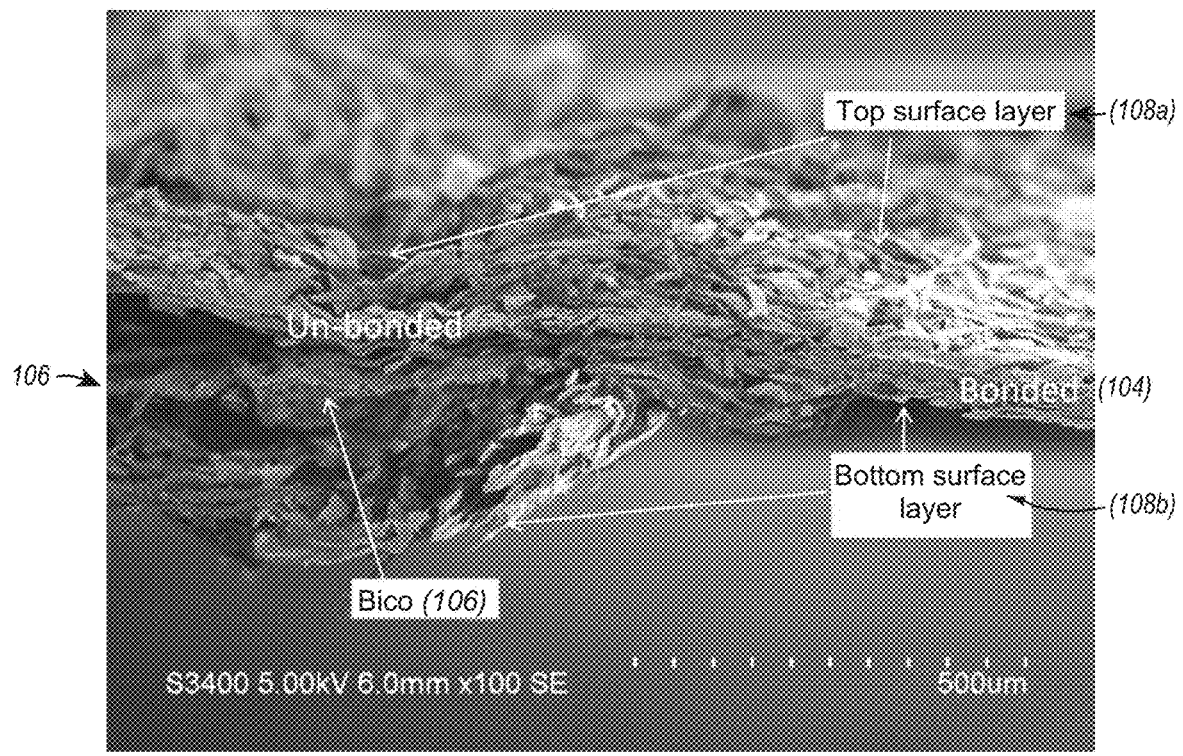
FIG. 3 shows an SEM image of an cross-sectional or edge view through an exemplary multi-layer substrate such as that of FIG. 2, showing the top surface layer, the bottom surface layer, and the thermoplastic film layer sandwiched there-between, where there are both bonded regions, and regions in which the thermoplastic layer and the adjacent exterior surface layer(s) are unbonded relative to one another.

FIG. 3 is an SEM image of an end or cross-section through an exemplary multi-layer substrate, such as that of FIG. 2, showing the thermoplastic film layer 106 (labeled "Bico") sandwiched between a top surface layer 108a, and a bottom surface layer 108b. Also labeled in FIG. 3 is a bonded region 104, as well as an unbonded region, adjacent a raised ridge "dot" of the bottom layer 108b. In this labeled unbonded region, there is a gap between the thermoplastic layer 106 and the bottom layer 108b. While in this region the bottom layer 108b is unbonded, in this same region, the thermoplastic layer 106 may (or may not be) bonded to the top layer 108a. In other words, the unbonded characteristic may apply to one or both faces of the thermoplastic layer.

a. Top and Bottom Exterior Surface Layers

The top and bottom surface layers are formed from a material that comprises synthetic fibers. Any of various nonwoven materials may be used, which are widely available from various commercial sources. Such layers and fibers may be meltblown, spunbond, spunlaid, SMS (spunbond-meltblown-spunbond), coform, carded webs, thermal bonded, thermoformed, spunlace, hydroentangled, needled, or chemically bonded. In an embodiment, such surface layers may also incorporate a fraction of pulp fibers therein (e.g., as a homogenous blend of randomly distributed synthetic and pulp fibers, or where the pulp fibers are positioned non-randomly, e.g., at an exterior, or at an interior surface). In any case, the fraction of synthetic fibers within the top and bottom exterior surface layers may be at least 50%, at least 60%, at least 70%, at least 80%, at least 90%, or at least 95%, by weight, of the fibers present in a given layer. In an embodiment, 100% of the fibers in a given exterior surface layer may be synthetic fibers.

A wide variety of synthetic materials that can be formed into fibers, and laid into a nonwoven substrate layer are appropriate for use in the contemplated multi-layer substrates. Examples of such polymeric synthetic materials include, but are not limited to polyethylene, polypropylene, PET, PVC, polyacrylics, polyvinyl acetates, polyvinyl alcohols, polyamides, polystyrenes, or the like. In an embodiment, the external surface layers may comprise a material other than polyethylene, and/or a material that does not have the tan delta characteristics possessed by the internal thermoplastic layer, which is configured to be melt-softened, bonding the 3 layers together.

The top and bottom synthetic nonwoven layers of the multi-layer substrate may have a basis weight of no more than 50 lbs, no more than 40 lbs, no more than 30 lbs, or no more than 20 lbs, at least 3 lbs, at least 5 lbs, or at least 10 lbs, such as from 7 lbs to 20 lbs, or 8 lbs to 15 lbs. Such "lbs" values refer to the weight per/3000 ft$^2$, as will be appreciated by those of skill in the art.

The individual layers of the top and bottom layers that are used in manufacturing the multi-layer substrate can be formed by any of a number of different techniques, e.g., such as any of those that will be readily apparent to those of skill in the art. Examples include, but are not limited to meltblown, spunbond, spunlaid, SMS (spunbond-meltblown-spunbond), coform, airlaid, wetlaid, carded webs, thermal bonded, through-air bonded, thermoformed, spunlace, hydroentangled, needled, or chemically bonded will be apparent to those of skill in the art, some of which are described in U.S. Pat. No. 7,696,109, already incorporated by reference.

Any of the nonwoven synthetic layers may comprise more than a single ply, or each may comprise only a single ply. Where multiple plies are provided, they may be adhered together, so as to have adequate peel strength, by any suitable technique, including use of a chemical adhesive between such plies. Where only a single ply is present in each of the top and bottom surface layers, no chemical adhesive may be present anywhere in the multi-layer substrates. Where two plies are used in either or both of the exterior surface layers, a chemical adhesive may be present in the surface layers (i.e., between plies), but may not be present between the thermoplastic layer and the adjacent top and bottom surface layers.

b. Thermoplastic Layer

The present multi-layer wipes include a sandwich structure in which a thermoplastic layer is provided, on the inside of the wipe, sandwiched between the top and bottom surface layers. While the surface layers may also be thermoplastic, these exterior layers may include different tan delta characteristics than the sandwiched thermoplastic layer. Where no chemical adhesive is used to adhere the 3 layers into an integral, single structure that does not readily delaminate between layers, but in which the thermoplastic sandwich "cheese" layer itself is used for this purpose, the Applicant has found that not just any thermoplastic polymer will be suitable for such a purpose. For example, in testing various thermoplastic polymers, Applicant found that various materials, even upon heating, will not readily bond to the adjacent nonwoven top or bottom surface layer, but will form a very weak bond, if any at all. Such weak bonding is of course unacceptable in a multi-layer substrate to be used as a cleaning wipe, where delamination must be avoided. In the present invention, the multi-layer substrates have sufficient adhesion between the layers that they do not delaminate even when wet (e.g., allowed to soak for weeks, in storage) or when used for cleaning hard surfaces. The interior thermoplastic layer not only binds the multi-layer substrate together as it melts, but it also may impart additional strength to the exterior layers, where these layers may be relatively weak. It is surprising that this binding of the exterior layers occurs so well that there is not any significant shredding of the exterior surface layer, e.g., as the multi-layer substrate is pulled through a typical wipe dispensing orifice.

For example, Applicant found that while polypropylene may seem like a suitable thermoplastic material to achieve such bonding between the top and bottom nonwoven surface layers separated by the interior thermoplastic material layer, polypropylene did not provide good bonding, but resulted in weak bonding and delamination between the 3 layers. Applicant found a key characteristic or indicator as to whether a given thermoplastic material would work, as an interior layer, is tan delta value. Tan delta value is an engineering characteristic that can be evaluated for thermoplastic polymeric materials, and gives information relative to how much "liquid" viscous phase characteristics dominate versus "solid" elastic phase characteristics, in a given material, at a given temperature. Tan delta is simply calculated as the ratio of viscous modulus divided by elastic modulus for a given material, at a given temperature.

Figure 4:
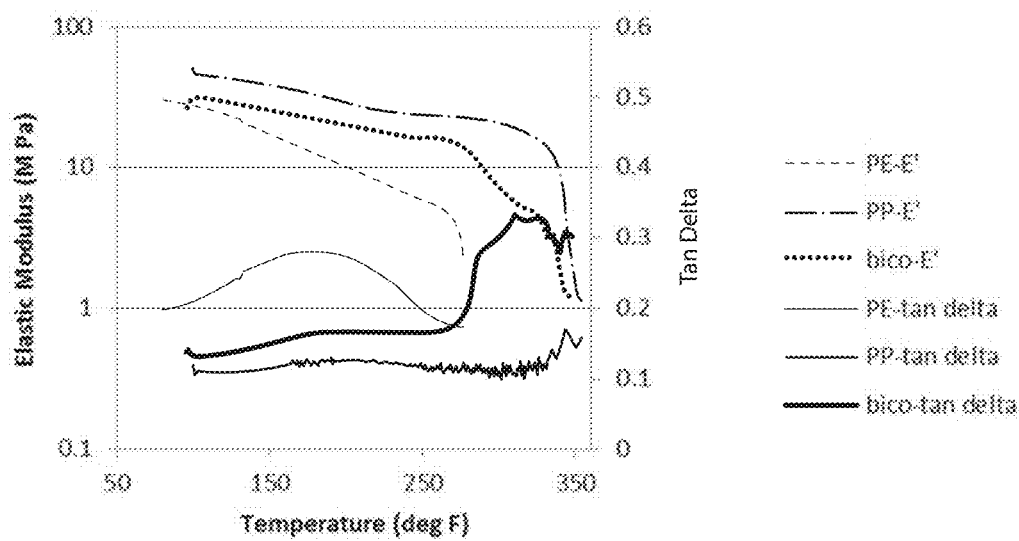
FIG. 4 is a chart showing elastic modulus and tan delta values versus temperature for polyethylene, polypropylene, and for a polymer comprised of "bicomponent" fibers, i.e., a ("bico") polymer.

FIG. 4 charts both tan delta and elastic modulus values for 3 tested thermoplastic materials—polyethylene, polypropylene, and a bicomponent material that comprises polyethylene. For example, the bicomponent material tested is believed to be comprised of bicomponent fibers, with a fiber core (that is not polyethylene), and an exterior coating on the core, that is polyethylene. FIG. 4 charts both elastic modulus and the tan delta value for these 3 materials over the temperature range of about 100° F. to 350° F. FIG. 4 shows how the elastic modulus (i.e., stiffness) of the polypropylene is the highest, followed by the "bico", followed by the polyethylene, and that the stiffness of each decreases with increasing temperature.

The tan delta value for the polypropylene is very low, less than 0.2, and remains less than 0.15 at temperatures from 100° F. to over 300° F. It isn't until nearly 350° F. that the tan delta value increases somewhat, but only slightly, up to a value of about 0.15, and certainly still less than 0.2. The polyethylene tan delta value is quite different, being about 0.2 at a temperature of 100° F., and increasing to about 0.25 to 0.3 at about 175° F.–190° F. After peaking at around this temperature, the tan delta value begins to decrease, to 0.2 at about 250° F., and dropping somewhat below 0.2 (e.g., about 0.18) at about 260°–270° F. Tan delta for the "bico" is between that of the polypropylene and the polyethylene for much of the temperature range, until about 250° F. where it is higher than the polyethylene. Both the polyethylene and the "bico" material (which comprises polyethylene) include points along the temperature range of 100° F. to 350° F. where tan delta is at least 0.2 (e.g., greater than 0.2 to 0.4, or greater than 0.2 to 0.3). The polypropylene tan delta never reaches 0.2 over this temperature range of 100° F. to 350° F. Thus, in an embodiment, the selected thermoplastic material for the interior "sandwich" layer has a tan delta value that is at least 0.2 (e.g., from 0.2 to 0.4, or from 0.2 to 0.3) somewhere within the temperature range of 100° F. to 350° F. In an embodiment, the selected thermoplastic material may have such a tan delta value at the particular temperature at which the thermal calendaring step is performed (e.g., 150° F., 175° F., 200° F., 225° F., 250° F., 275° F., 300° F., 325° F., etc.) or at any narrower range within the temperature range of 100° F. to 350° F.

The selected thermoplastic material may advantageously have a melting temperature that is less than 400° F., less than 375° F., less than 350° F., less than 325° F., less than 300° F., at least 150° F., at least 175° F., at least 200° F., or at least 225° F. Having a relatively lower melting temperature of course reduces energy requirements needed in the calendaring process, but may also be important depending on what synthetic materials are used in the top and bottom surface layers, to ensure they do not decompose, ignite, or melt. Where any pulp fiber content is included in the exterior surface layers, it can be important to ensure the temperature is low enough that such pulp fibers do not ignite, or become embrittled or discolored due to "burning", which may occur even below the paper ignition temperature of 451° F. As such, selection of lower melting temperature thermoplastic materials may be preferred, so long as they can provide a good bond to the exterior synthetic top and bottom layers.

Figure 5A:
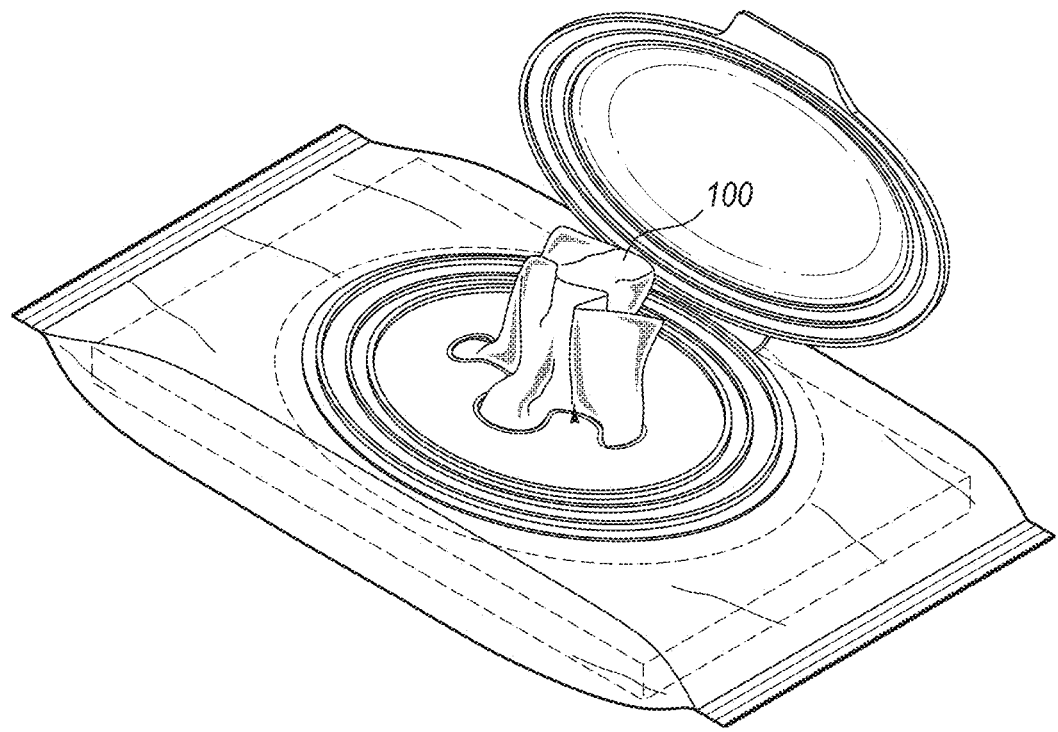
FIGS. 5A-5B illustrate various exemplary wipes packages which may be used to store and dispense wipes formed according to the present invention.
Figure 5B:
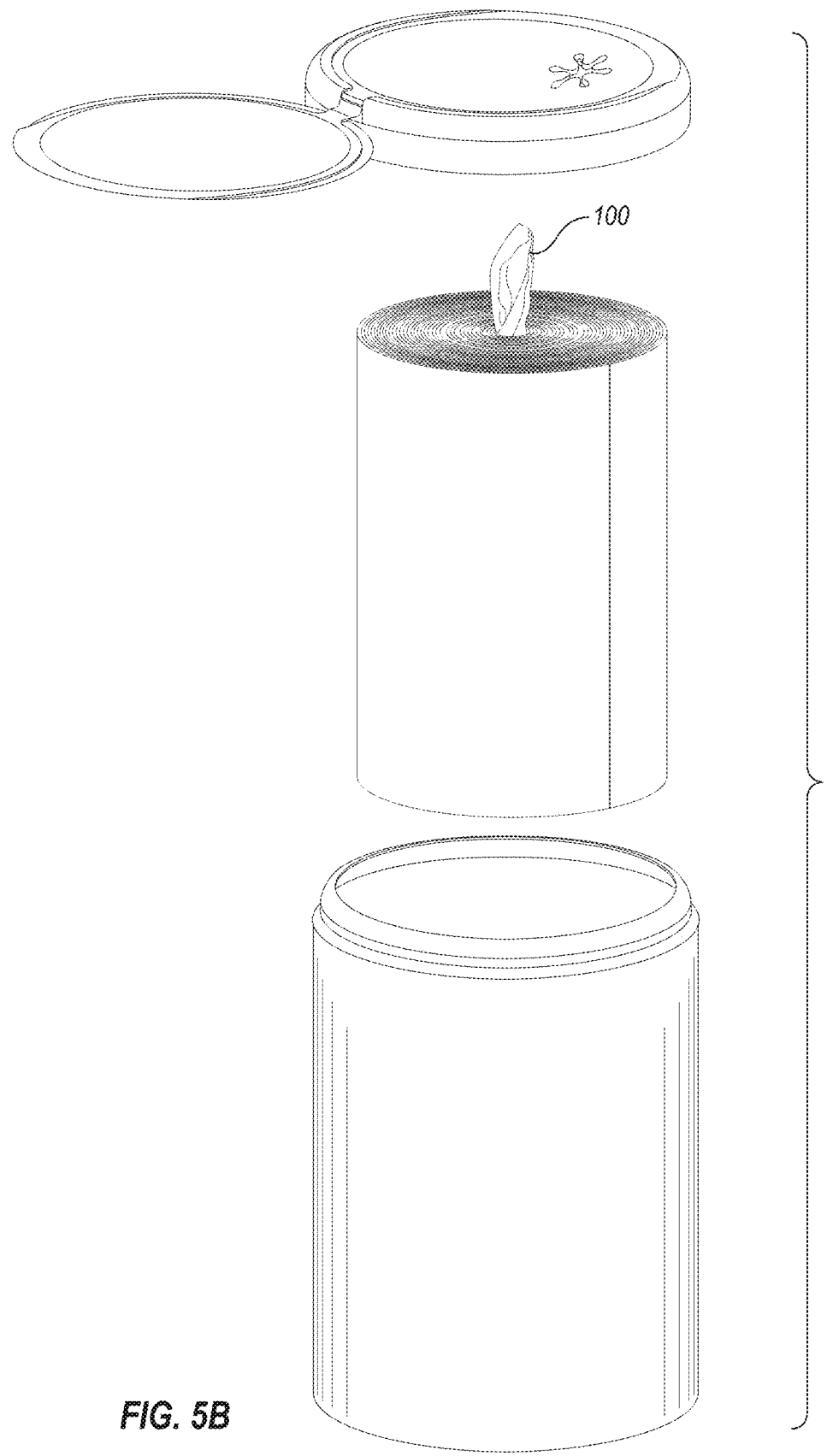
Figure 6:
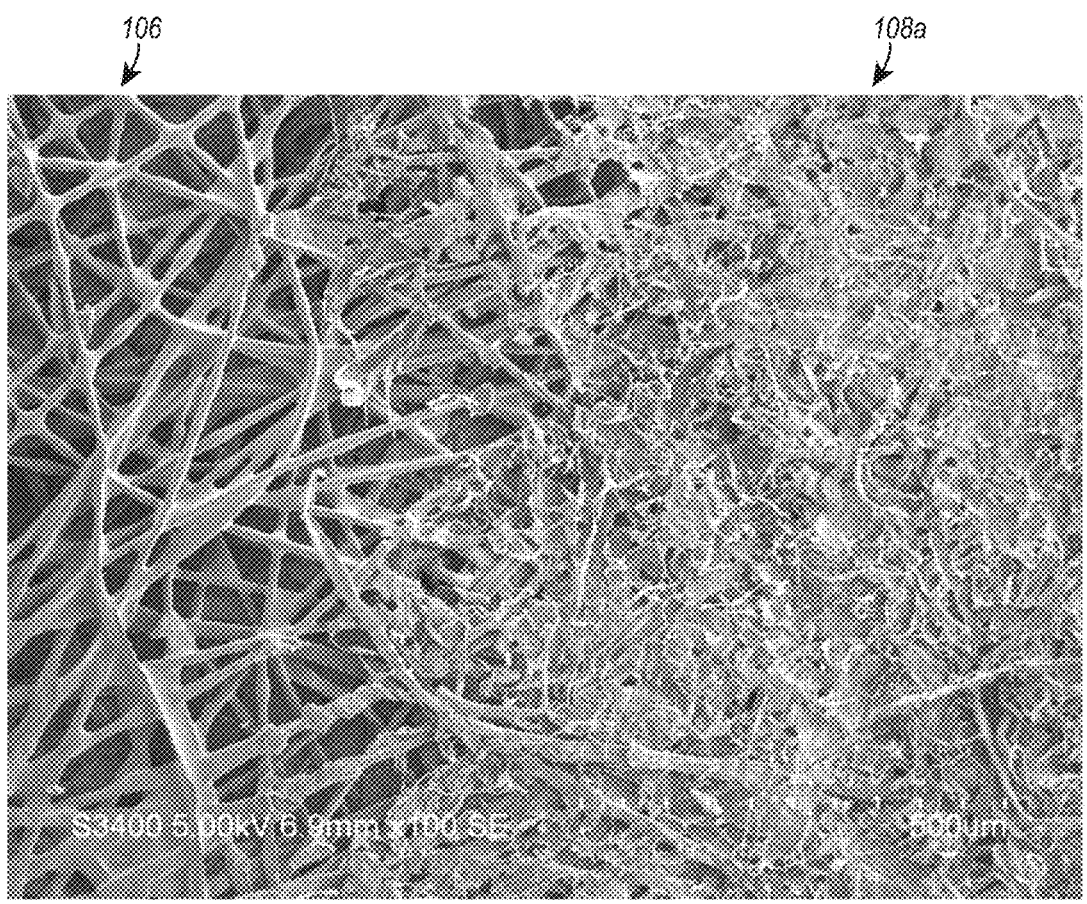
FIG. 6 is an SEM image showing spunbond thermoplastic fibers of the sandwich layer enveloping adjacent fibers of the adjacent top surface layer.
Figure 7A:
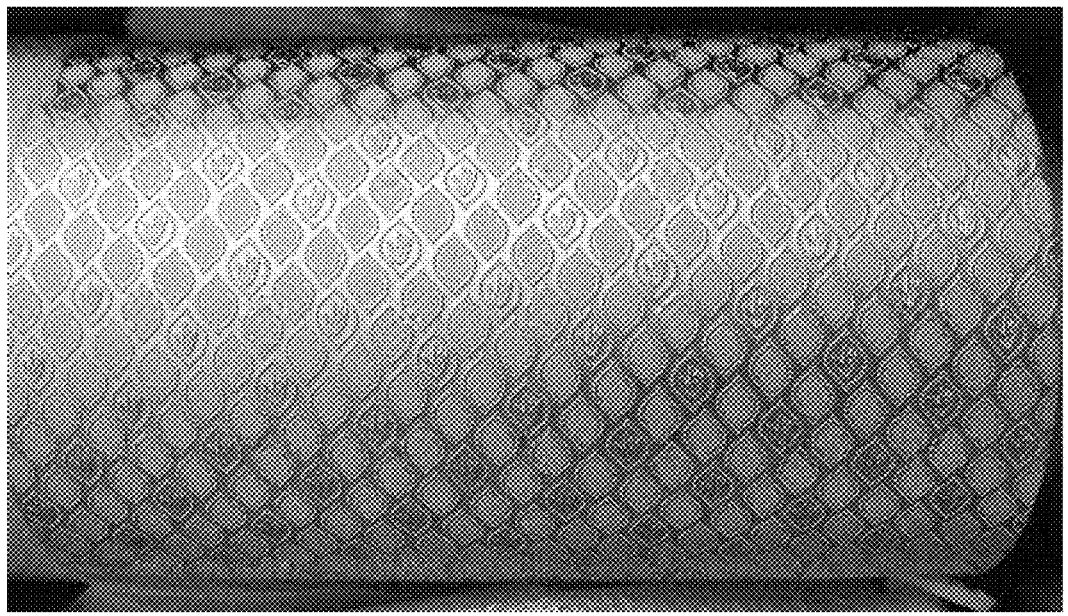
FIGS. 7A-7F illustrate additional exemplary textures and patterns.
Figure 7B:
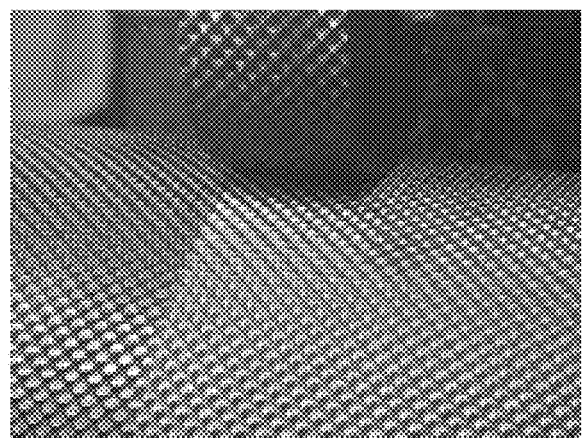
Figure 7C:
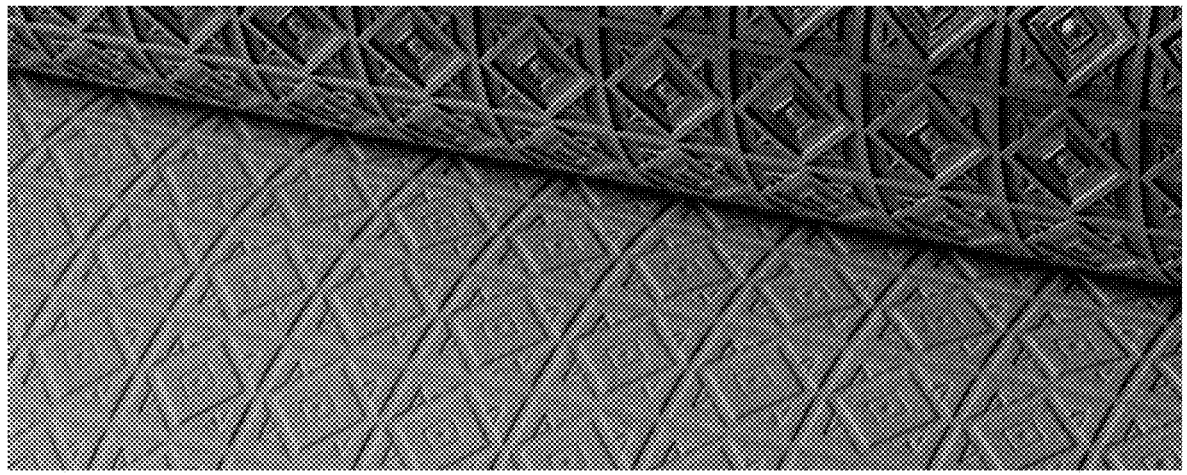
Figure 7D:
Figure 7E:
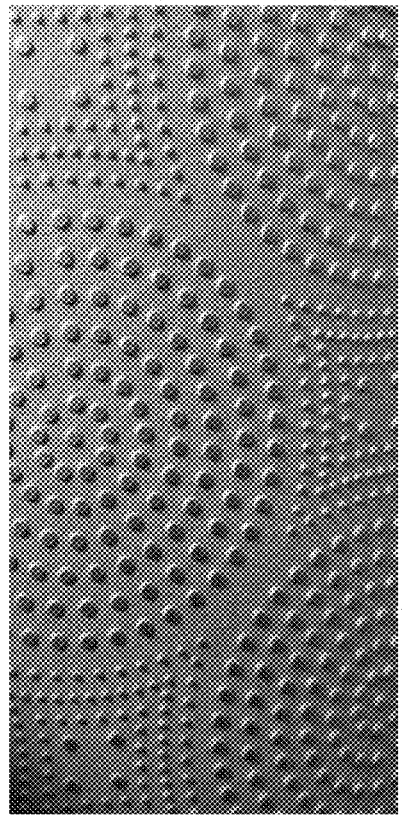
Figure 7F:
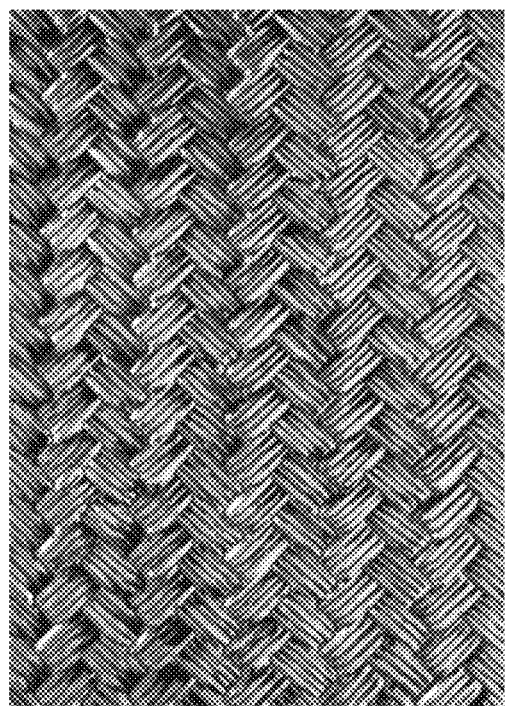

FIGS. 5A-5B show how the present multi-layer substrates may be packaged within any of various exemplary flex packs (FIG. 5A), cylinders (FIG. 5B) or other containers for storage and dispensing. The wipes 100 may be pulled through an orifice such as typically provided with such containers, without fear of shredding or delamination of the various layers. For example, when pulling the present wipes through any of the typical dispensing orifices associated with such containers, there is no significant shredding of the exterior surface layers, or delamination of the layers from one another. Rather, each wipe is able to be pulled through the orifice, remaining fully intact, time after time. FIG. 6 shows an SEM image at the interface between a spunbond fibrous interior thermoplastic layer 106 and an adjacent exterior surface layer (e.g., 108a) showing how the fibers of the exterior layer at the interface are wrapped around, enveloped, or coated by the melt-softened thermoplastic material, that occurs during the thermal calendaring process. This strong connection between the nonwoven exterior surface layer and the interior thermoplastic layer provides a strong bond, so that shredding or delamination do not occur when pulling the wipe through a typical wipe pack orifice. These characteristics are believed to result because of the tan delta characteristics of the interior thermoplastic material layer described above in conjunction with FIG. 4.

The thermoplastic film layer is not required to be particularly thick. For example, the thermoplastic film layer may have a thickness of 0.01 mm to 0.1 mm, or 0.01 mm to 0.05 mm. It may be so thin so as to be transparent or translucent, prior to assembly into the sandwich structure. That said, it will be apparent that if desired, the thermoplastic middle sandwich layer may be thicker. For example, it may have a thickness that varies depending on the structural characteristics of such layer (e.g., whether it is deposited as loose fibers (e.g., loose bico fibers, or loose fibers otherwise comprising a material having the desired tan delta characteristics), an intact film, yarn (e.g., loose yarn), an intact nonwoven layer, a woven layer, or the like). It will be apparent that the thermoplastic middle sandwich layer may thus have a thickness ranging from 0.01 mm to 5 mm, from 0.01 mm to 3 mm, from 0.01 mm to 2 mm, from 0.01 mm to 1 mm, from 0.01 mm to 0.5 mm, or the like.

Strength and/or stiffness characteristics of the wipe may be dictated at least in part by the characteristics of the middle thermoplastic layer of the present substrate. For example, strength and stiffness of the substrate as a whole may progressively increase as one uses, respectively, fibers, a film, a yarn, a nonwoven (e.g., a bico nonwoven), or a woven structured material for the middle sandwich layer. Such materials are listed generally in order of increasing resiliency, where strength and/or stiffness of the overall substrate increases with increasing resiliency of the middle layer. Of course, thickness of the middle layer will also affect the strength and/or stiffness of the finished substrate. By way of further explanation, at a given thickness, a woven structure for the thermoplastic middle sandwich layer may provide the greatest strength and/or stiffness to the substrate, while a nonwoven thermoplastic middle sandwich layer would typically provide somewhat lower strength and/or stiffness. Use of a yarn, e.g., where multiple fibers are twisted or otherwise arranged together, providing a yarn diameter significantly greater than that of the individual fibers making up the yarn may provide somewhat lower stiffness and strength, and a film or simple deposition of individual, loose fibers onto either of the exterior surface layers to form the thermoplastic middle sandwich layer may provide even lower stiffness and/or strength.

It will be apparent that numerous possible configurations are possible as to the structure of the thermoplastic middle sandwich layer, and that numerous possible methods are possible for providing such (e.g., providing preformed layers, for example, as a film, nonwoven, or woven) that are simply placed between the exterior layers, or by providing one of the exterior surface layers, and then depositing individual loose fibers, yarn or the like onto the interior surface of such exterior layer, followed by positioning the other exterior surface layer thereover, after which the 3-layer structure is then subjected to heat and/or pressure, to adhere the layers to one another, and cause the formation of cracks, fissures and the like through the thermoplastic middle sandwich layer, through which a cleaning lotion that eventually becomes loaded into the substrate can pass from one exterior surface layer, through the thermoplastic middle sandwich layer, to the other exterior surface layer. For example, one could provide a nonwoven exterior surface layer of any suitable material (e.g., PET), which serves as a carrier to lay down loose fibers (or fibers formed into a yarn) onto the PET or other suitable exterior surface layer. Finally, the opposite exterior surface layer (e.g., another PET nonwoven layer) may be positioned over the loose fibers or loose yarn, and the 3-layer structure may be processed with appropriate heat and/or pressure to melt soften the thermoplastic middle sandwich layer, as described herein.

In some embodiments, it may be desirable to provide the substrate with a lofted structure, so as to increase the bulk and thickness of the substrate, where such lofted characteristics may not otherwise be provided with all synthetic layers. With synthetic substrate layers, such lofting may be provided by any suitable technique that may increase the bulk and thickness of the layer, by adding lofted material thereto, which includes gaps, air pockets, and/or a fuzzy, lofted characteristic.

By way of example, one possible method for increasing the loft of a fully synthetic substrate (e.g., where each of the at least 3 described layers are synthetic) may be through overfeeding one or more of the layers (e.g., exterior layers) into the rollers which heat and press the layered substrate. For example, the feed rate of one or both exterior surface layers may be greater than a pick up rate on the other side of such rollers, which causes the material of the overfed layers to bunch up or create pleats as it enters the rollers (e.g., the heated nip and the opposite roller) where the melt softening of the middle layer occurs. This causes such bunched up, pleated, or similar lofted configuration including air gaps to be locked in as the middle layer melt softens, and bonds to the exterior overfed layer including such pleated, bunched up, or otherwise lofted configuration. This gives the overfed layer a lofted configuration which is durable after dosing and during use, more akin to what may be provided with a fuzzy, lofted pulp containing (non-synthetic) layer. Other techniques for providing a lofted layer (e.g., particularly on either or both exterior surface layers) may also be used. For example, a pin roller could be used to pull portions of the exterior surface layer laterally outward from the substrate plane, creating a fuzzy, lofted texture with decreased density and increased volume and thickness to such layer. Various other techniques will be apparent to those of skill in the art, in light of the present disclosure.

Where desired, any of the substrate layers or materials could be selected to be biodegradable and/or compostable (e.g., meeting the standard of ASTM D6400 or other applicable standard).

c. Cleaning Composition

Many cleaning composition components as known within the art may be suitable for use in the present pre-dosed wipes. In an embodiment, the cleaning composition is an aqueous composition, including at least 70%, at least 80%, or at least 90% water by weight (e.g., 90% to 99% water). The composition may include 0.05% to 5% by weight of a quaternary ammonium compound, and/or 0.1% to 5% by weight of a glycol ether solvent. For example, the quaternary ammonium compound may be included from 0.05%, from 0.1%, up to 5%, up to 4%, up to 3%, up to 2%, or up to 1% by weight of the cleaning composition. The glycol ether solvent may be included from 0.1%, from 0.25%, up to 5%, up to 4%, up to 3%, up to 2%, or up to 1% by weight of the cleaning composition. Other solvents, surfactants, and various other adjuvants often included in cleaning compositions may optionally be present. While some embodiments may include lower alcohol solvents (e.g., $C_1$-$C_4$ alcohols), the amount of such volatile solvents may be limited, e.g., to less than 10%, less than 5%, less than 3%, less than 2%, or less than 1% by weight. In some embodiments, the composition may be free of, or substantially free of, such lower alcohol or other highly volatile solvents.

Quaternary ammonium compounds have broad spectrum antimicrobial properties. A variety of different quaternary ammonium compounds can be used in the cleaning composition. Non-limiting examples of quaternary ammonium compounds are typically halides (e.g., a chloride) of alkyldimethylbenzylammonium, alkyldimethylethylbenzylammonium, alkyldimethylammonium, or the like. The alkyl groups of such quaternary ammonium compounds may typically range from $C_{12}$ to $C_{18}$. Quaternary ammonium compounds are described in more detail in U.S. Pat. No. 6,825,158, incorporated by reference herein, and will already be familiar to those of skill in the art.

Organic acids can also be used to provide antimicrobial properties. By way of example, such an organic acid may be included in an amount of at least 0.1%, or at least 0.5%, up to 5%, up to 4%, up to 3%, up to 2%, or up to 1% by weight of the cleaning composition.

The cleaning composition may include a glycol ether solvent. Exemplary glycol ether solvents include, but are not limited to, ethylene glycol monopropyl ether, ethylene glycol monobutyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and/or propionate esters of glycol ethers.

Those of skill in the art will appreciate that any among a wide variety of surfactants (e.g., anionic, cationic, non-ionic, zwitterionic, and/or amphoteric) may be included in the cleaning composition, as desired. Where included, a surfactant may be present from 0.05%, from 0.1%, up to 10%, up to 5%, up to 4%, up to 3%, up to 2%, or up to 1% by weight of the cleaning composition. Various surfactants and other optional adjuvants are disclosed in U.S. Pat. No. 3,929,678 to Laughlin and Heuring, U.S. Pat. No. 4,259,217 to Murphy, U.S. Pat. No. 5,776,872 to Giret et al.; U.S. Pat. No. 5,883,059 to Furman et al.; U.S. Pat. No. 5,883,062 to Addison et al.; U.S. Pat. No. 5,906,973 to Ouzounis et al.; U.S. Pat. No. 4,565,647 to Llenado, and U.S. Publication No. 2013/0028990. The above patents and applications are each herein incorporated by reference in their entirety.

As used herein the term "liquid" and "cleaning composition" includes, but is not limited to, solutions, emulsions, suspensions and so forth. Thus, liquids may comprise and/or contain one or more of the following: disinfectants; antiseptics; diluents; surfactants, such as nonionic, anionic, cationic; waxes; antimicrobial agents; sterilants; sporicides; germicides; bactericides; fungicides; virucides; protozoacides; algicides; bacteriostats; fungistats; virustats; sanitizers; antibiotics; pesticides; and so forth. Examples of some such components are included in, but not limited to, U.S. Pat. Nos. 6,825,158; 8,648,027; 9,006,165; 9,234,165, 9,988,594 and U.S. Publication Nos. 2008/003906 and 2018/0216044, each of which is herein incorporated by reference in its entirety. In some embodiments, it may be possible to provide the substrates in dry form, where dosing with a selected cleaning composition may occur later (e.g., by the user).

With regard to pre-moistened substrates, a selected amount of liquid may be added to the container or wipes during manufacture such that the cleaning substrates contain the desired amount of liquid. The substrates are not necessarily loaded to their saturation point, but are typically loaded with the cleaning composition to some ratio less than full saturation. For example, many substrates are capable of holding about 8 to 14 times their weight in liquid. For various reasons, the substrates may be loaded at a loading ratio less than saturation, e.g., less than 6:1, less than 5:1, less than 4:1, such as from 1:1 to 4:1, from 2:1 to 4:1, from 2.5:1 to 3.5:1, from 2.5:1 to 3:1 or from 2.5:1 to 3.75:1.

Where the substrate may be configured so as to be all synthetic, this may offer additional flexibility in the chemistries that may be dosed (e.g., during manufacture) onto such substrate for use, while minimizing or eliminating risk of undesired incompatibility that may result between components of such compositions and substrates that may include pulp, other natural fibers, or other natural components. By way of non-limiting example, a wide variety of bleaching agents (e.g., chlorine-based and otherwise, including peroxides) may be used with such synthetic substrates. Compositions which achieve disinfection based on acids may also be used. Such acid disinfectants and bleaches are often incompatible with non-synthetic substrate materials. Non-limiting examples of such compositions are disclosed in U.S. Pat. No. 5,460,833 to Andrews et al.; U.S. Pat. No. 6,221,823 to Crisanti; U.S. Pat. No. 6,346,279 to Rochon et al.; U.S. Pat. No. 6,551,980 to Wisniewski et al.; U.S. Pat. No. 6,699,825 to Rees et al.; U.S. Pat. No. 6,803,057 to Ramirez et al.; U.S. Pat. No. 6,812,196 to Rees et al.; U.S. Pat. No. 6,936,597 to Urban; U.S. Pat. No. 7,008,600 to Katsigras et al.; U.S. Pat. No. 7,070,737 to Bains et al.; U.S. Pat. No. 7,354,604 to Ramirez et al.; U.S. Pat. No. 7,598,214 to Cusack et al.; U.S. Pat. No. 7,605,096 to Tamarchio et al.; U.S. Pat. No. 7,658,953 to Bobbert; U.S. Pat. No. 7,696,143 to McCue et al.; U.S. Pat. No. 7,915,207 to Chopskie et al.; U.S. Pat. No. 8,569,220 to Gaudrealt; U.S. Pat. No. 8,575,084 to Gaudrealt; U.S. Pat. No. 10,064,409 to Hazenkamp et al.; U.S. Pat. No. 10,076,115 to Salminen et al.; U.S. Publication No. 2007/0190172 to Bobbert; PCT Publication Nos. WO 99/18180 to Raso et al.; WO 99/53006 to Masotti et al.; WO 2004/067194 to Arrigoni et al.; WO 2004/104147 to Rosiello et al.; WO 2017/174959 to Convery; and EPO Publication EP 2843034 to Nedic et al.

d. Other Characteristics

The size and shape of the wipe can vary with respect to the intended application and/or end use of the same. The cleaning substrate can have a substantially rectangular shape of a size that allows it to readily engage standard cleaning equipment or tools such as, for example, mop heads, duster heads, brush heads, mitten shaped tools for wiping or cleaning, and so forth. In another embodiment, another shape, e.g., circular, oval, or the like) may be provided.

The wipes or other cleaning substrates may be provided pre-moistened with a cleaning composition. The wet cleaning substrates can be maintained over time in a sealable container such as, for example, within a bucket or tub with an attachable lid, sealable plastic pouches or bags, canisters, jars, and so forth. Desirably the wet, stacked cleaning substrates are maintained in a resealable container. The use of a resealable container is particularly desirable when using aqueous volatile liquid compositions since substantial amounts of liquid can evaporate while using the first sheets thereby leaving the remaining sheets with little or no liquid. Exemplary resealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5,595,786 to McBride et al.; the entire contents of each of the aforesaid references are incorporated herein by reference.

Typically, the cleaning substrates are stacked and placed in the container and the liquid subsequently added thereto, all during mass manufacturing. It is advantageous that the thermoplastic layer at the center of each wipe not be liquid impervious, to facilitate easier loading of the wipes. As described herein, even if the thermoplastic film as initially provided before lamination of the 3 layers together is liquid impervious, Applicant has found that cracks or other fluid pathways are opened up within the film during thermal calendaring, as contemplated herein. While this may not necessarily occur with any and all thermal calendaring operations, it does occur under the conditions contemplated herein.

The presence of such cracks or other fluid pathways that are opened up during manufacture of the multi-layer substrate advantageously allow liquid cleaning composition dosed on either face of the substrate to migrate through the wipe, to the opposite exterior face, through the thermoplastic film layer. This similarly allows the dosed cleaning composition to migrate from one substrate to the next, e.g., where the substrates are stacked (e.g., by wicking the liquid from one to the next). For example, a given volume or weight of the cleaning composition may simply be dosed into the bottom of the container, allowing it to wick into the stack of wipes. In the case of a donut configuration, by placing the cleaning composition into the bottom of the cylindrical container, an end of each wipe actually make simultaneous contact with the cleaning composition in the bottom of the container, where it can be wicked up into the height of each wipe (and the height of the donut). This may actually occur with a donut configuration whether the thermoplastic film layer were "broken" to include the described fluid pathways or not (i.e., if it remained impervious), as both the top and bottom surface layers will contact the cleaning composition at the bottom of the container simultaneously. Where any initially liquid impervious characteristics of the film are "broken" by the thermal calendaring process, this may further aid the cleaning composition in wicking upwards throughout the full height of each wipe, and the donut as a whole.

No matter the packaging and dosing process, once manufactured and packaged, the substrate can subsequently be used to wipe a surface. The moistened cleaning substrates can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto.

The wipes or other cleaning substrates of the present invention can be provided in a kit form, wherein a plurality of cleaning substrates and a cleaning tool are provided in a single package.

In addition to material composition and construction (e.g., synthetic nonwoven on the exterior, thermoplastic layer having particular tan delta characteristics only on the inside, not on the exposed face, composition of the cleaning "lotion" and the like), wipe or other substrate dimensions can also be used to control dosing as well as provide ergonomic appeal. In one embodiment, substrate dimensions are from about 5½ inches to about 11 inches in length, and from about 5½ inches to about 11 inches in width to comfortably fit in a hand. The substrate can have dimensions such that the length and width differ by no more than about 2 inches. Larger substrates may be provided that can be used and then folded, either once or twice, so as to contain dirt within the inside of the fold and then the wipe can be re-used. Such larger substrates may have a length from about 5½ inches to about 13 inches and a width from about 10 inches to about 13 inches. Such substrates can be folded once or twice and still fit comfortably in the hand.

e. Antimicrobial Efficacy & Other Characteristics

Exemplary multi-layer substrates are tested for their ability to effectively deliver an antimicrobial quaternary ammonium compound to a surface during simulated cleaning. By way of example, the multi-layer substrates of the present invention may be loaded with cleaning compositions including from 0.1% to 3%, such as 0.1% to 2% by weight of quat. In an embodiment, the wipes may release at least 40%, at least 50%, at least 55%, at least 60%, or at least 65% of the quaternary ammonium compound (i.e., quaternary ammonium compound in the squeezate as compared to the cleaning composition before loading). The wipes may exhibit at least a 3-log reduction in a target microbe, such as *Staphylococcus aureus*, within a given time frame (e.g., such as 5 minutes, 4 minutes, 3 minutes, 1 minute, 30 seconds, 10 seconds, etc.).

The present wipes may provide for a significantly higher quat release than conventional commercially available wipes, which do not include the same construction geometry as described herein. This may be due to several factors, e.g., including limited if any chemical adhesive content, as well as the presence of absorptive pockets or gaps, e.g., such as seen in FIG. 3, adjacent the unbonded regions. Such gaps provide a significant absorptive region between the thermoplastic film layer and the unbonded raised region 102, which can serve as a reservoir for the cleaning composition. Such regions allow significant quantities of the cleaning composition to be stored within the substrate, to be released upon squeezing, wiping, or other compression, where there is reduced contact between the quat in the composition and any anionic binding sites that may be associated with the exterior surface layers.

The degree of lamination and strength of the bond between adjacent layers in the multi-layer substrate typically depends on the temperature, pressing or contact time, and applied pressure associated with the calendaring operation. Temperature may be a primary variable responsible for bond strength achieved, although pressure and time may also have an effect, and may also affect the resulting texture that is "embossed" into the pulp fiber surface layer, and the resulting bond pattern. Where the synthetic nonwoven exterior layers provided on both exterior faces are embossed with a texture, the resulting multi-layer substrate exhibits a more "cloth-like" feel that is drapable and less stiff, as compared to where only one of the two faces is embossed with a texture. In addition, it was observed that all else being equal, heavier nonwovens (i.e., greater lb or gsm weight) produces a stiffer substrate. FIGS. 7A-7F illustrate various possible embossing patterns that can be applied by the calendar rollers. It will be apparent that the possibilities are nearly limitless.

Temperatures applied during calendaring may be at least 150° F., at least 175° F., at least 200° F., from 200° F. to 400° F., or from 200° F. to 350° F. Applied pressure may be at least 50 psi, at least 100 psi, at least 150 psi, at least 200 psi, from 100 psi to 1000 psi, or from 300 psi to 600 psi. Contact time (time at the given pressure and/or temperature) may be at least 100 ms, at least 200 ms, from 100 ms to 5 s, from 200 ms to 1 s, or from 200 ms to 500 ms.

Such a manufacturing process may be attractive, e.g., as compared to traditional non-woven substrate manufacture, as it may not require any processing of individual fibers not already provided in a nonwoven layer, water usage, water filtration, drying steps, loss of fibers during processing, and the like. In addition, the present calendaring process may allow for greater production line speeds (e.g., up to 900 m/min, typically from 50 m/min to 600 m/min) as compared to spinlace manufacturing conventional blended substrates (that are not multi-layer), which are at significantly lower line production speeds.

Increased line speed results in decreased contact time (all else being equal). To provide the desired good bonding, higher line speed may be accommodated by increasing web surface temperature (so shorter contact time is needed), increasing the roller diameter (thus increasing contact time), or increasing applied pressure (nip pressure). By way of example, for every 25 m/min increase in line speed, temperature can be increased by about 5% (in ° C.) to maintain bonding level).

With respect to embossed textures, it was observed that "pin" textures (e.g., associated with fine dots) can result in tearing of the top and bottom surface layers, as the fibers get caught on the pins. Thus, textures that are formed using more of a "flat bar" type contact versus a sharp "pin" may be preferred, as such larger features do not result in such tearing. In addition, it was observed that when manufacturing such substrates through a calendaring operation, that the thermoplastic "cheese" layer should be narrower in width than the top and bottom surface "bread" layers in order to further minimize complications during manufacture. From such a processed multi-layer laminated web, individual sized wipes may be cut to the desired size. Edges of the web that may not include the thermoplastic "cheese" layer could be cut away during such cutting, if desired. The present substrates also provide for the ability to modulate the substrate stiffness by changing the pattern applied during calendaring (e.g., see the various patterns of FIG. 1E or 7A-7F), as well as the ability to modulate stiffness and tensile strength characteristics by providing texturing on one or both of the substrate faces.

Without departing from the spirit and scope of this invention, one of ordinary skill can make various modifications to the invention to adapt it to various usages and conditions. As such, these changes and modifications are properly, equitably, and intended to be, within the full range of equivalence of the following claims.

The invention claimed is:
1. A multi-layer substrate comprising:
(a) a top surface layer comprising a synthetic nonwoven material that is at least one of meltblown, spunbond, spunlaid, SMS (spunbond-meltblown-spunbond), coformed, carded web, thermal bonded, thermoformed, spunlace, hydroentangled, needled, or chemically bonded;
(b) a middle layer comprising a melted thermoplastic material comprising polyethylene, or having a tan delta value of 0.2 to 0.4 within the temperature range of 100° F. to 350° F.;
(c) a bottom surface layer comprising a synthetic nonwoven material that is at least one of meltblown, spunbond, spunlaid, SMS (spunbond-meltblown-spunbond), coformed, carded web, thermal bonded, thermoformed, spunlace, hydroentangled, needled, or chemically bonded; and
(d) a cleaning composition loaded onto said multi-layer substrate wherein a fluid pathway through the melted thermoplastic material allows the cleaning composition to travel from the top surface layer to the bottom surface layer;
(e) wherein the multi-layer substrate is void of any chemical adhesives, the melted thermoplastic material instead, when melted, bonding to groups of fibers in the synthetic nonwoven material that are in direct contact with the thermoplastic material as it melts and fractures, forming fluid pathways; and (f) wherein the middle layer is melted from the polyethylene, wherein the polyethylene is initially in the form of a liquid impervious thin film, which becomes porous upon melting so as to provide the fluid pathway through which the cleaning composition is able to travel from both the top surface layer to the bottom surface layer and from the bottom surface layer to the top surface layer.

2. The multi-layer substrate of claim 1, wherein the top layer and the bottom layer each consist essentially of the synthetic nonwoven material.

3. The multi-layer substrate of claim 1, wherein the synthetic nonwoven material of the top layer and the bottom layer has a tan delta value that differs from that of the melted thermoplastic material.

4. The multi-layer substrate of claim 1, wherein the synthetic nonwoven material of the top layer and the bottom layer each consist of a blend of pulp fibers and synthetic nonwoven fibers.

5. The multi-layer substrate of claim 1, wherein the cleaning composition comprises a quaternary ammonium compound.

6. The multi-layer substrate of claim 5, wherein at least 50% of a quaternary ammonium compound included in the cleaning composition loaded onto the multi-layer substrate is released from the multi-layer substrate to a surface being cleaned.

7. The multi-layer substrate of claim 1, wherein the cleaning composition comprises an organic acid.

8. The multi-layer substrate of claim 1, wherein the thermoplastic material of the middle layer is a film having a thickness from 0.01 mm to 0.05 mm.

9. The multi-layer substrate of claim 1, wherein the multi-layer substrate includes:
  (i) unbound regions where the thermoplastic material is not bound to adjacent fibers of the top or bottom surface layer; and
  (ii) bound regions where the thermoplastic material is bound to adjacent fibers of both the top and bottom surface layer.

10. The multi-layer substrate of claim 9, wherein the unbound regions correspond to raised texture features embossed in the top or bottom surface layer.

11. The multi-layer substrate of claim 10, further comprising a gap associated with the unbound region in which the cleaning composition is stored.

12. A multi-layer substrate comprising:
  (a) a top surface layer consisting essentially of synthetic nonwoven fibers that are at least one of meltblown, spunbond, spunlaid, SMS (spunbond-meltblown-spunbond), coformed, carded web, thermal bonded, thermoformed, spunlace, hydroentangled, needled, or chemically bonded;
  (b) a porous melted middle layer comprising a thermoplastic film layer having a tan delta value from 0.2 to 0.4 within the temperature range of 100° F. to 350° F., the melted thermoplastic film layer having a thickness of less than 0.05 mm;
  (c) a bottom surface layer consisting essentially of synthetic nonwoven fibers that are at least one of meltblown, spunbond, spunlaid, SMS (spunbond-meltblown-spunbond), coformed, carded web, thermal bonded, thermoformed, spunlace, hydroentangled, needled, or chemically bonded; and
  (d) a cleaning composition loaded onto said multi-layer substrate wherein a fluid pathway through the melted thermoplastic film layer allows the cleaning composition to travel from the top surface layer to the bottom surface layer;
  (e) wherein the multi-layer substrate is void of any chemical adhesives, the melted thermoplastic film layer instead, when heated, bonding to groups of fibers in the top or bottom surface layer that are in direct contact with the middle layer comprising the thermoplastic film layer as it melts; and
  (f) wherein the melted middle layer is melted from the thermoplastic material, wherein the thermoplastic material is initially in the form of a liquid impervious thin film, which becomes porous upon melting so as to provide the fluid pathway through which the cleaning composition is able to travel from both the top surface layer to the bottom surface layer and from the bottom surface layer to the top surface layer.

13. The multi-layer substrate of claim 12, wherein the cleaning composition comprises a quaternary ammonium compound.

14. The multi-layer substrate of claim 12, wherein the cleaning composition comprises an organic acid.

15. The multi-layer substrate of claim 12, wherein the thermoplastic film of the middle layer has a thickness from 0.01 mm to 0.05 mm.

16. The multi-layer substrate of claim 12, wherein the thermoplastic film of the middle layer comprises polyethylene, and the top and bottom surface layers comprise at least one of PET or PP.

17. The multi-layer substrate of claim 16, wherein the polyethylene is initially in the form of a liquid impervious thin film, which becomes porous upon melting so as to provide the fluid pathway through which the cleaning composition is able to travel from the top surface layer to the bottom surface layer.

18. The multi-layer substrate of claim 12, wherein at least 50% of a quaternary ammonium compound included in the cleaning composition loaded onto the multi-layer substrate is released from the multi-layer substrate to a surface being cleaned.

19. The multi-layer substrate of claim 12, wherein the multi-layer substrate includes:
  (i) unbound regions where the thermoplastic material is not bound to adjacent fibers of the top or bottom surface layer; and
  (ii) bound regions where the thermoplastic material is bound to adjacent fibers of both the top and bottom surface layer.

20. The multi-layer substrate of claim 19, wherein the unbound regions correspond to raised texture features embossed in the top or bottom surface layer, the multi-layer substrate further comprising a gap associated with the unbound region in which the cleaning composition is stored.

* * * * *